(12) United States Patent
Danov et al.

(10) Patent No.: US 9,028,699 B2
(45) Date of Patent: May 12, 2015

(54) ASSEMBLY AND METHOD FOR SEPARATING MAGNETISABLE PARTICLES FROM A LIQUID

(75) Inventors: Vladimir Danov, Erlangen (DE); Andreas Schröter, Androde (DE)

(73) Assignee: Siemens Aktiengesellschaft, Munich (DE)

( * ) Notice: Subject to any disclaimer, the term of this patent is extended or adjusted under 35 U.S.C. 154(b) by 316 days.

(21) Appl. No.: 13/702,794

(22) PCT Filed: Apr. 11, 2011

(86) PCT No.: PCT/EP2011/055603
§ 371 (c)(1),
(2), (4) Date: Dec. 7, 2012

(87) PCT Pub. No.: WO2011/154178
PCT Pub. Date: Dec. 15, 2011

(65) Prior Publication Data
US 2013/0087506 A1 Apr. 11, 2013

(30) Foreign Application Priority Data
Jun. 9, 2010 (DE) .......................... 10 2010 023 131

(51) Int. Cl.
*C02F 1/48* (2006.01)
*B03C 1/033* (2006.01)
*B03C 1/28* (2006.01)

(52) U.S. Cl.
CPC ................. *C02F 1/48* (2013.01); *B03C 1/0332* (2013.01); *B03C 1/0335* (2013.01); *B03C 1/288* (2013.01); *B03C 2201/18* (2013.01)

(58) Field of Classification Search
CPC ....... C02F 1/48; B03C 1/0335; B03C 1/0332; B03C 1/288; B03C 2201/18
See application file for complete search history.

(56) References Cited

U.S. PATENT DOCUMENTS

| 4,214,986 A | 7/1980 | Watson et al. ................ 210/695 |
| 4,306,970 A | 12/1981 | Tanaka et al. ................ 210/222 |
| 4,416,771 A | 11/1983 | Henriques ...................... 209/224 |
| 5,483,042 A | 1/1996 | Sprenger et al. ............. 219/647 |
| 5,770,461 A | 6/1998 | Sakazume et al. ........... 436/526 |
| 6,558,541 B1 | 5/2003 | Morrison ...................... 210/222 |
| 8,357,294 B2 * | 1/2013 | Danov et al. .................. 210/222 |

(Continued)

FOREIGN PATENT DOCUMENTS

| EP | 1913991 A1 | 4/2008 | ............ B01D 43/00 |
| GB | 633373 A | 12/1949 | ............... B03C 1/28 |

(Continued)

OTHER PUBLICATIONS

Translation of the Chapter II International Preliminary Report on Patentability for PCT/EP2011/055603, undated.*
International Search Report and Written Opinion, Application No. PCT/EP2011/055603, 20 pages.

*Primary Examiner* — David A Reifsnyder
(74) *Attorney, Agent, or Firm* — King & Spalding L.L.P.

(57) ABSTRACT

An assembly for separating magnetisable particles from a liquid may include a tubular reactor through which the liquid can flow and which includes a first region with at least one permanent magnet and a second region with at least one electromagnet. The first and the second region are arranged one behind the other along a longitudinal axis of the tubular reactor.

18 Claims, 1 Drawing Sheet

(56) References Cited

U.S. PATENT DOCUMENTS

| | | | |
|---|---|---|---|
| 2002/0134730 A1 | 9/2002 | Bose | 210/695 |
| 2011/0163039 A1 | 7/2011 | Danov et al. | 210/695 |
| 2011/0168607 A1 | 7/2011 | Ries | 209/212 |
| 2011/0174710 A1 | 7/2011 | Hartmann et al. | 210/222 |
| 2012/0125858 A1 | 5/2012 | Hartmann et al. | 210/695 |

FOREIGN PATENT DOCUMENTS

| | | | |
|---|---|---|---|
| WO | 2009/026566 A1 | 2/2009 | B03C 1/01 |
| WO | 2010/031613 A1 | 3/2010 | B03B 1/24 |
| WO | 2010/031682 A1 | 3/2010 | B03C 1/00 |
| WO | 2010/031714 A1 | 3/2010 | B03C 1/033 |
| WO | 2011/154178 A1 | 12/2011 | B03C 1/033 |

* cited by examiner

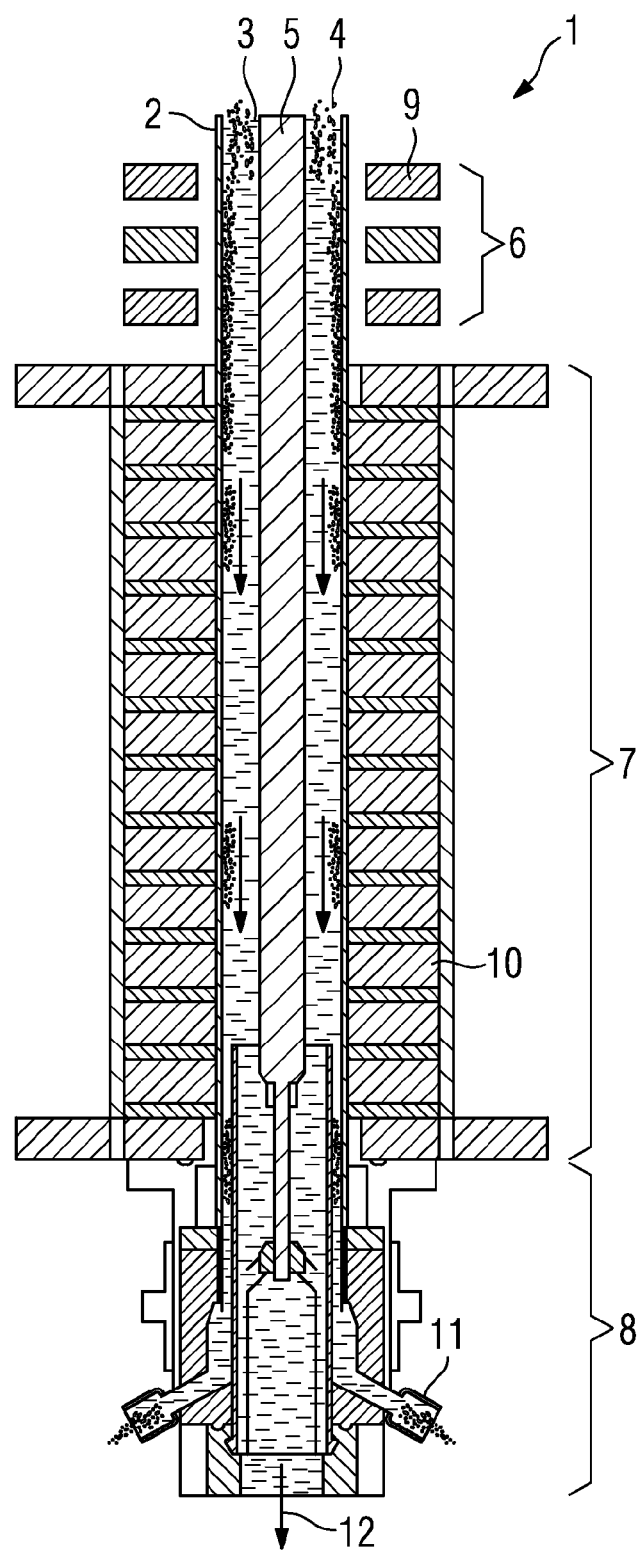

ASSEMBLY AND METHOD FOR SEPARATING MAGNETISABLE PARTICLES FROM A LIQUID

CROSS-REFERENCE TO RELATED APPLICATIONS

This application is a U.S. National Stage Application of International Application No. PCT/EP2011/055603 filed Apr. 11, 2011, which designates the United States of America, and claims priority to DE Patent Application No. 10 2010 023 131.2 filed Jun. 9, 2010 The contents of which are hereby incorporated by reference in their entirety.

TECHNICAL FIELD

The present disclosure relates to an assembly and a method for separating magnetizable particles from a liquid, said assembly comprising a tubular reactor, through which the liquid can flow and which comprises a first region with at least one first magnet and a second region with at least one second magnet, whereby the first and the second region are arranged one behind the other along a longitudinal axis of the tubular reactor.

BACKGROUND

Methods for separating magnetic or magnetizable particles from liquids are employed inter alia in the case of continuous ore separation or in the case of water treatment. In this situation, the magnetizable particles may become magnetized during the process or may already be magnetized. The term magnetizable particles is also assumed to cover the term magnetic particles in the following. Magnetizable particles are for example magnetite ($Fe_3O_4$) particles obtained from iron ore bearing rocks.

Prefabricated magnetizable particles can also be used in order to obtain compounds from ores, for example by employing chemically functionalized or physically activated magnetized particles. With the aid of magnetizable particles, it is furthermore possible to separate trace elements from a solution, solids from a suspension, or liquids having different phases from one another.

Finely ground ores which are suspended with the aid of water can be used as solids. Constituents of the ores can then be bonded directly or after addition of the magnetizable particles, chemically or physically to the particles. Coulomb interactions for example can be used for physical bonds and sulfidic functionalizations can be employed for chemical bonds. The magnetizable particles "loaded" with the ore constituents or the magnetizable ore particles can be separated from the liquid by means of magnetic fields and processed further. In the case of "loaded" particles, the bonded ore constituent can subsequently be separated from the magnetic particles. The particles can be reused in the process.

With the aid of these methods, instead of solids it is also possible to separate liquids having different phases from one another, in water treatment for example. It is therefore possible for example to remove oils from water by chemically or physically bonding the oil compounds to the magnetizable particles. In similar fashion to the ores, the "loaded" magnetizable particles can be separated from the liquid. The particles can also be reused, as described previously.

A known system for separating magnetizable particles from a liquid, such as is known for example from WO 2010/031613 A1, is based on a tubular reactor having a traveling magnetic field. The traveling magnetic field is generated by electromagnets which are arranged along a longitudinal axis of the tubular reactor at the circumference of the reactor. The magnetic field generated by the electromagnets on the one hand provides for a movement of the magnetizable particles in the direction of the wall of the reactor. On the other hand, the traveling field provides for a movement of the magnetizable particles along the wall as far as a region of the reactor in which the magnetizable particles are extracted by suction from the reactor.

In order to be able to penetrate the liquid completely with the aid of the magnetic field and to be able to move all the magnetizable particles in the liquid in the direction of the wall of the reactor, the magnetic field generated by the electromagnets must be designed to be very strong. This equates to a high energy consumption by the electromagnets. In addition, strong magnetic fields can result in the magnetizable particles adhering strongly to the wall. A movement of the magnetizable particles along the wall may then require high magnetic field gradients which can vary in time, which in turn signify a high energy consumption by the electromagnets and a high level of technical complexity with regard to the design and control of the electromagnets.

SUMMARY

In one embodiment, an assembly is provided for separating magnetizable particles from a liquid, said assembly comprising a tubular reactor, through which the liquid can flow and which comprises a first region and a second region, wherein the first and the second region are arranged one behind the other along a longitudinal axis of the tubular reactor, and wherein at least one first magnet is arranged in the first region and at least one second magnet is arranged in the second region, wherein the at least one first magnet is a permanent magnet and the at least one second magnet is an electromagnet, wherein the tubular reactor has at least one branching suction extraction line for extracting the magnetizable particles by suction in the wall of the tubular reactor in a third region which is arranged along the longitudinal axis of the tubular reactor after the first and the second region.

In a further embodiment, the at least one electromagnet is designed to generate a traveling magnetic field along the longitudinal axis of the tubular reactor, in particular in the second region, for the directional transportation of the magnetizable particles essentially parallel to the longitudinal axis of the tubular reactor, in particular along a wall of the tubular reactor. In a further embodiment, the at least one permanent magnet is designed to transport the magnetizable particles essentially perpendicular to the longitudinal axis of the tubular reactor, in particular in the direction of the wall of the tubular reactor. In a further embodiment, the third region is arranged adjacent to the second region. In a further embodiment, the tubular reactor has a displacement element, in particular along a center axis of the tubular reactor, for reducing the volume available to the liquid inside the tubular reactor. In a further embodiment, the at least one first magnet is arranged in the first region along an outer circumference of the tubular reactor and/or the at least one second magnet is arranged in the second region along an outer circumference of the tubular reactor.

In another embodiment, a method is provided for separating magnetizable particles from a liquid, wherein the liquid flows through a tubular reactor and in a first step in a first region at least one permanent magnet moves the magnetizable particles in the direction of the wall of the tubular reactor and in a second step in a second region at least one electromagnet generates a traveling field which moves the magnetizable particles along the wall of the tubular reactor to a third region where it is separated from the liquid by way of at least one suction extraction line.

In a further embodiment, the second step follows the first step temporally and/or spatially. In a further embodiment, the liquid containing magnetizable particles is a mixture of liquids, in particular oil and water, and/or a suspension, in particular of ore and water. In a further embodiment, a component of the mixture and/or of the suspension is bonded in particular chemically and/or physically to the magnetizable particles and the magnetizable particles are subsequently temporally and/or spatially separated partially or completely from the liquid, in particular by way of at least one suction extraction line in the third region of the tubular reactor.

In a further embodiment, along a center axis of the tubular reactor in the tubular reactor a displacement element displaces the liquid to an in particular essentially hollow cylindrical space between displacement element and wall of the tubular reactor. In a further embodiment, the at least one permanent magnet generates a magnetic field which moves the magnetizable particles in the direction of the wall of the tubular reactor without the magnetizable particles adhering immovably to the wall of the tubular reactor. In a further embodiment, the liquid and/or the magnetizable particles are transported with the aid of gravity and/or with the aid of a liquid flow generated by pumping from the first by way of the second to the third region of the tubular reactor, whereby a partial or complete separation of liquid and magnetizable particles takes place in the second and/or third region. In a further embodiment, the separation takes place in succession temporally and spatially as a result of the movement of the magnetizable particles through the magnetic field of the at least one permanent magnet to the wall of the tubular reactor, the movement along the wall through the traveling magnetic field of the at least one electromagnet, and as a result of suction extraction of the magnetic particles transported on the wall by way of at least one suction extraction line, wherein the liquid without or essentially without magnetic particles is discharged from the tubular reactor by way of a drain different from the at least one suction extraction line. In a further embodiment, the tubular reactor is operated as an open circulation system, wherein liquid and/or magnetizable particles which leave the tubular reactor are fed back into it, in particular after further method steps.

BRIEF DESCRIPTION OF THE DRAWINGS

An example embodiment is explained in more detail below with reference to FIG. 1, which shows a schematic sectional view of an assembly 1 having a tubular reactor 2.

DETAILED DESCRIPTION

Embodiments of the present disclosure provide an assembly and a method wherein a reliable movement of the magnetizable particles is possible with reduced magnetic field strengths of the traveling field and thus reduced energy consumption by the electromagnets in comparison with known assemblies and methods, as well as an assembly and a method which function reliably with a reduced level of technical complexity.

In some embodiments, the assembly for separating magnetizable particles from a liquid comprises a tubular reactor through which the liquid can flow. The tubular reactor has a first region and a second region, the first and the second region being arranged one behind the other along a longitudinal axis of the tubular reactor. At least one first magnet is arranged in the first region and at least one second magnet is arranged in the second region. The at least one first magnet is a permanent magnet and the at least one second magnet is an electromagnet. When a plurality of first magnets is used these are permanent magnets and when at least a plurality of second magnets is used these are electromagnets.

As a result of the additional use of permanent magnets alongside the use of electromagnets in different spatial regions, magnetic fields separated spatially from one another can be generated without an additional energy requirement.

The at least one electromagnet can be designed to generate a traveling magnetic field along the longitudinal axis of the tubular reactor, in particular in the second region. The magnetic field can naturally also project beyond the second region. The traveling field can be designed for the directional transportation of the magnetizable particles essentially parallel to the longitudinal axis of the tubular reactor. In this situation, the magnetizable particles can be transported or moved essentially along a wall of the tubular reactor.

The at least one permanent magnet can be designed in such a manner that as a result of its action the magnetizable particles are transported essentially perpendicular to the longitudinal axis of the tubular reactor, in particular in the direction of the wall of the tubular reactor.

The tubular reactor can have at least one branching suction extraction line for extracting the magnetizable particles by suction. The at least one branching suction extraction line may be arranged in the wall of the tubular reactor in a third region which is situated along the longitudinal axis of the tubular reactor after the first and the second region. This can be directly adjacent to the second region or with an interspace.

The tubular reactor can have a displacement element for reducing the volume available to the liquid inside the tubular reactor. Said displacement element may be arranged along a center axis of the tubular reactor. By this means the cross-sectional area which is available allowing the liquid to flow is reduced, and a lower magnetic strength may be required for a complete penetration of the cross-sectional area by the magnetic field of the at least one permanent magnet. This reduces the technical complexity and the quantity of permanent magnets, and therefore saves on both space and costs.

The at least one first magnet can be arranged in the first region along an outer circumference of the tubular reactor. The at least one second magnet can be arranged in the second region along an outer circumference of the tubular reactor.

The method for separating magnetizable particles from a liquid, wherein the liquid flows through a tubular reactor, comprises a first step in which in a first region at least one permanent magnet moves the magnetizable particles in the direction of the wall of the tubular reactor. In addition it comprises a second step in which in a second region at least one electromagnet generates a traveling field which moves the magnetizable particles along the wall of the tubular reactor to a third region.

The second step can follow the first step temporally and/or spatially.

A simplified design of the magnets is made possible as a result of the temporal and spatial separation of the individual steps. The first step, using the at least one permanent magnet, consumes no energy during the process and nevertheless enables a reliable movement of the magnetizable particles in the direction of the wall. This means that a first step of the separation of liquid and magnetizable particles is achieved without an electrical energy requirement.

The second step, the movement of the magnetizable particles along the wall using traveling fields generated by electromagnets, can take place with smaller magnetic fields than would be necessary for a movement of the particles in the direction of the wall. This saves energy and the electromagnets can be designed to be smaller. Savings of material and space are therefore achieved.

A further saving can be achieved by using a displacement element along a center axis of the tubular reactor in the tubular reactor. Said displacement element can displace the liquid to an essentially hollow cylindrical space between displacement element and wall of the tubular reactor. As previously in the case of the assembly, a reduction takes place in the flow cross-section of the liquid which must be penetrated by the magnetic field of the at least one permanent magnet. This means that the at least one permanent magnet can be designed to be smaller whilst maintaining reliable movement of the magnetizable particles in the direction of the wall. Material and cost savings can be achieved with regard to the design of the at least one permanent magnet.

It may be advantageous if the at least one permanent magnet generates a magnetic field which moves the magnetizable particles in the direction of the wall of the tubular reactor without the magnetizable particles adhering immovably to the wall of the tubular reactor. With regard to the design and arrangement of the at least one permanent magnet for generating such a magnetic field or a magnetic field of this predetermined strength, a simple and cost-effective movement of the magnetic particles may be provided by the electromagnets with a low energy requirement. A disruption in the temporal continuity of the process can be prevented because no strongly adhering magnetizable particles on the wall can block the further course of the process.

The liquid containing magnetizable particles can be a mixture of liquids, in particular oil and water, and/or a suspension, in particular of ore and water.

A component of the mixture and/or of the suspension can be chemically and/or physically bonded to the magnetizable particles. The magnetizable particles can subsequently be temporally and/or spatially separated partially or completely from the liquid. In this situation, a separation can take place for example by way of at least one suction extraction line in the third region of the tubular reactor.

In one embodiment, the liquid and/or the magnetizable particles can be transported with the aid of gravity and/or with the aid of a liquid flow generated by pumping from the first by way of the second to the third region of the tubular reactor.

A partial or complete separation of liquid and magnetizable particles can take place in the second and/or third region in this case.

The separation can take place in succession temporally and spatially as a result of the movement of the magnetizable particles through the magnetic field of the at least one permanent magnet to the wall of the tubular reactor, the movement along the wall through the traveling magnetic field of the at least one electromagnet, and as a result of suction extraction of the magnetic particles transported on the wall by way of at least one suction extraction line. In this situation, the liquid without or essentially without magnetizable particles can be discharged from the tubular reactor by way of a drain different from the at least one suction extraction line.

The tubular reactor can also be operated as an open circulation system wherein liquid and/or magnetizable particles which leave the tubular reactor are fed back into it. This can take place for example after further method steps in which the liquid and/or magnetizable particles are subjected to recycling steps or reprocessing.

The assembly 1 shown in FIG. 1 comprises a tubular reactor 2, through which a liquid 3 containing magnetizable particles 4 flows. The reactor 2 can for example be set up perpendicular to the surface of the earth in order to be able to utilize the effect of gravity. A flow of the liquid 3 and the movement of the magnetizable particles 4 in the reactor can therefore be influenced by gravity. Pumps not shown for the sake of simplicity can additionally support or essentially maintain the flow of the liquid 3.

The reactor 2 can essentially be subdivided into three regions. The first region 6 comprises at least one or a plurality of permanent magnets 9 which are arranged along the outer circumference of the tubular reactor 2. According to the magnetization of the magnetizable particles 3, the permanent magnets 9 can be oriented with their north pole side, or alternatively with their south pole side, toward the tubular reactor 2. An alternating assembly having permanent magnets 9 with their north pole and south pole sides facing toward the reactor 2 or reactor center is also possible.

The second region 7 of the reactor 2 comprises at least one electromagnet 10 which is constructed for example from one or more electrical coils with and/or without an iron core. As a rule, a series of coils is arranged along the longitudinal axis of the reactor 2, which coils can be regulated or controlled in succession to generate a magnetic field. By this means a traveling magnetic field is produced which can for example have a magnetic field amplitude in the form of a wave which travels temporally in the flow direction of the liquid 3 or along the longitudinal axis of the reactor 2. The coils are arranged for example in annular fashion around the outer circumference of the reactor 2.

In the third region 8 of the reactor 2, which follows the second region 7 spatially along the longitudinal axis of the reactor 2, is arranged a suction unit or a suction pipe or a plurality of suction pipes 11. A vacuum can be applied to the suction pipes 11.

The liquid 3 flows from the first region 6, by way of the second region 7 to the third region 8 in the tubular reactor 2. At the start of the first region 6 the magnetizable particles 4 are evenly distributed in the liquid 3. The permanent magnets 9 in the first region 6 generate a magnetic field in the interior of the tubular reactor 2 in the first region 6, which field draws or moves the magnetizable particles 4 to the wall of the reactor 2. As a result of the flow of the liquid 3 or as a result of gravity, the magnetizable particles 4 move along the wall into the second region 7 which follows the first region 6 spatially along the longitudinal axis of the reactor 2. In the second region 7 the traveling field of the electromagnets 10 results in an acceleration of the magnetizable particles 4 in the direction along the longitudinal axis of the reactor. The traveling field accelerates the particles 4 in such a manner that they accumulate in the form of agglomerates and move along the wall. The agglomerated magnetizable particles 4 are moved by the traveling field of the electromagnets 10 by way of the second region 7 into a third region 8 of the tubular reactor 2.

In the third region 8 of the reactor 2, arranged along the circumference thereof are suction pipes 11 which can be opened briefly when agglomerated magnetizable particles 4 are passing through. When the suction pipes 11 in the wall of the reactor 2 are opened the agglomerated magnetizable particles 4 can be extracted by suction. After the openings are closed, liquid 3 without or essentially without magnetizable particles, which is situated between agglomerates of particles 4 in the flow, can flow out of the reactor 2 without being extracted by suction by way of the suction pipes 11. This means that as a result of suction extraction by way of the suction pipes 11 a separation takes place of the magnetic particles 4 from the liquid 3 which leaves the reactor 2 by way of the reactor exit 12 different from the openings of the suction pipes 11.

What is claimed is:

1. An assembly for separating magnetizable particles from a liquid, said assembly comprising:
   tubular reactor configured to communicate the liquid and which comprises a first region and a second region,
   wherein the first region and the second region are arranged one behind the other along a longitudinal axis of the tubular reactor,
   wherein at least one first magnet is arranged in the first region and at least one second magnet is arranged in the second region,
   wherein the at least one first magnet is a permanent magnet and the at least one second magnet is a electromagnet, and
   wherein the tubular reactor has at least one branching suction extraction line for extracting the magnetizable particles by suction in the wall of the tubular reactor in a third region arranged along the longitudinal axis of the tubular reactor after the first and the second region.

2. The assembly of claim 1, wherein the at least one electromagnet is configured to generate a traveling magnetic field along the longitudinal axis of the tubular reactor for the directional transportation of the magnetizable particles essentially parallel to the longitudinal axis of the tubular reactor.

3. The assembly of claim 1, wherein the at least one permanent magnet is designed to transport the magnetizable particles essentially perpendicular to the longitudinal axis of the tubular reactor.

4. The assembly of claim 1, wherein the third region is arranged adjacent to the second region.

5. The assembly of claim 1, wherein the tubular reactor comprises a displacement element configured to reduce a volume available to the liquid inside the tubular reactor.

6. The assembly of claim 1, wherein the at least one first magnet is arranged in the first region along an outer circumference of the tubular reactor.

7. The assembly of claim 6, wherein the at least one second magnet is arranged in the second region along an outer circumference of the tubular reactor.

8. The assembly of claim 1, wherein the liquid containing magnetizable particles is a mixture or a suspension of oil and water.

9. A method for separating magnetizable particles from a liquid, comprising:
   communicating the liquid through a tubular reactor,
   using at least one permanent magnet in a first region of the tubular reactor to move the magnetizable particles in a direction of a wall of the tubular reactor,
   using at least one electromagnet in a second region of the tubular reactor to generate a traveling field that moves the magnetizable particles along the wall of the tubular reactor to a third region of the tubular reactor, and
   using at least one suction extraction line in the third region of the tubular reactor to separate the magnetizable particles from the liquid.

10. The method of claim 9, wherein the step of moving the magnetizable particles using the at least one electromagnet in the second region follows the step of moving the magnetizable particles using the at least one permanent magnet in the first region.

11. The method of claim 9, wherein the liquid containing magnetizable particles is a mixture of liquids or suspension.

12. The method of claim 11, wherein a component of the mixture or of the suspension is chemically or physically bonded to the magnetizable particles, and the magnetizable particles are subsequently separated, at least partially, from the liquid via the at least one suction extraction line in the third region of the tubular reactor.

13. The method of claim 9, wherein along a center axis of the tubular reactor in the tubular reactor a displacement element displaces the liquid to an essentially hollow cylindrical space between the displacement element and wall of the tubular reactor.

14. The method of claim 9, wherein the at least one permanent magnet generates a magnetic field that moves the magnetizable particles in the direction of the wall of the tubular reactor without the magnetizable particles adhering immovably to the wall of the tubular reactor.

15. The method of claim 9, wherein at least one of the liquid and the magnetizable particles is transported with the aid of gravity or a liquid flow generated by pumping from the first by way of the second to the third region of the tubular reactor, whereby a partial or complete separation of liquid and magnetizable particles takes place in at least one of the second and third regions.

16. The method of claim 15, wherein the separation takes place in succession temporally and spatially as a result of the movement of the magnetizable particles through the magnetic field of the at least one permanent magnet to the wall of the tubular reactor, the movement along the wall through the traveling magnetic field of the at least one electromagnet, and as a result of suction extraction of the magnetic particles transported on the wall by way of the at least one suction extraction line, wherein the liquid without or essentially without magnetic particles is discharged from the tubular reactor by way of a drain different from the at least one suction extraction line.

17. The method of claim 9, wherein the tubular reactor is operated as an open circulation system, wherein liquid and/or magnetizable particles that leave the tubular reactor are subsequently fed back into the tubular reactor.

18. The method of claim 9, wherein the liquid containing magnetizable particles is a mixture or a suspension of oil and water.

* * * * *